United States Patent
Imaya

(10) Patent No.: US 10,131,019 B2
(45) Date of Patent: Nov. 20, 2018

(54) LASER PROCESSING METHOD AND LASER PROCESSING MACHINE

(71) Applicant: AMADA HOLDINGS CO., LTD., Kanagawa (JP)

(72) Inventor: Shoichi Imaya, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 15/853,098

(22) Filed: Dec. 22, 2017

(65) Prior Publication Data

US 2018/0111230 A1 Apr. 26, 2018

Related U.S. Application Data

(62) Division of application No. 15/035,928, filed as application No. PCT/JP2014/079559 on Nov. 7, 2014.

(30) Foreign Application Priority Data

Nov. 28, 2013 (JP) .................................. 2013-245635
Nov. 29, 2013 (JP) .................................. 2013-247033

(51) Int. Cl.
*B23K 26/388* (2014.01)
*B23K 26/00* (2014.01)
(Continued)

(52) U.S. Cl.
CPC .......... *B23K 26/388* (2013.01); *B23K 26/006* (2013.01); *B23K 26/0093* (2013.01);
(Continued)

(58) Field of Classification Search
CPC ...... B23K 15/00–15/02; B23K 15/08–15/085; B23K 26/00–26/0063; B23K 26/0093; B23K 26/14–26/146; B23K 26/346; B23K 26/36; B23K 26/38–26/388
(Continued)

(56) References Cited

U.S. PATENT DOCUMENTS 2,747,259 A * 5/1956 Brioux ..................... A44C 9/00
29/896.412
5,223,692 A 6/1993 Lozier et al.
(Continued)

FOREIGN PATENT DOCUMENTS

DE 10 2004 039 023 2/2006
JP 58-43884 3/1983
(Continued)

OTHER PUBLICATIONS

International Search Report for PCT/JP2014/079559 dated Jan. 20, 2015.

*Primary Examiner* — Michael Laflame, Jr.
(74) *Attorney, Agent, or Firm* — Greenblum & Bernstein, P.L.C.

(57) ABSTRACT

A laser processing machine for carrying out hole-forming on a plate-shaped workpiece is provided. A first program storage that stores a plurality of hole-forming programs and a second program storage that stores a plurality of cutout piece drop programs are also provided. A program selector that selects, from the second program storage, a cutout piece drop program associated with a hole-forming program selected from the first program storage to form the hole on the workpiece. A working head controller that controls a laser processing head according to the hole-forming program and the cutout piece drop program that are selected is also provided. A motion path of the processing head after forming the hole on the workpiece and a jetting condition of assist gas to an inside of the outline from the processing head on the motion path are programmed in each of the plurality of cutout piece drop programs.

4 Claims, 6 Drawing Sheets

(51) Int. Cl.
   *B23K 26/142*   (2014.01)
   *B23K 26/08*    (2014.01)
   *G05B 19/18*    (2006.01)
   *B23K 26/382*   (2014.01)
   *B23K 26/16*    (2006.01)
   *B23K 26/38*    (2014.01)
   *B23Q 7/00*     (2006.01)

(52) U.S. Cl.
   CPC ........ *B23K 26/0876* (2013.01); *B23K 26/142* (2015.10); *B23K 26/16* (2013.01); *B23K 26/38* (2013.01); *B23K 26/389* (2015.10); *B23Q 7/006* (2013.01); *G05B 19/182* (2013.01); G05B 2219/36199 (2013.01); G05B 2219/45041 (2013.01); H05K 999/99 (2013.01)

(58) Field of Classification Search
   USPC ............... 219/121.6, 121.67–121.72, 121.85
   See application file for complete search history.

(56) References Cited

U.S. PATENT DOCUMENTS

| | | | |
|---|---|---|---|
| 7,419,083 B1* | 9/2008 | Cheng | B23K 1/0008 156/62 |
| 8,679,394 B2 | 3/2014 | Harrington et al. | |
| 2007/0084906 A1* | 4/2007 | Vargas | B23K 33/004 228/119 |
| 2008/0099446 A1* | 5/2008 | Belanger | B23K 15/0066 219/121.14 |
| 2010/0049179 A1* | 2/2010 | Kanaoka | B29C 66/1142 606/11 |
| 2011/0307050 A1 | 12/2011 | Harrington et al. | |
| 2012/0125897 A1* | 5/2012 | Sasaki | B23K 26/0066 219/121.6 |
| 2012/0251708 A1* | 10/2012 | Miyazaki | C12Q 1/001 427/58 |
| 2013/0177360 A1* | 7/2013 | Hecht | B23C 5/207 407/113 |
| 2014/0155985 A1 | 6/2014 | Harrington et al. | |
| 2014/0212233 A1* | 7/2014 | Park | C04B 35/117 407/118 |
| 2016/0096239 A1* | 4/2016 | Raichle | B23K 26/123 219/74 |
| 2016/0297033 A1* | 10/2016 | Imaya | B23K 26/388 |

FOREIGN PATENT DOCUMENTS

| | | |
|---|---|---|
| JP | 4-367391 | 12/1992 |
| JP | 5-9772 | 2/1993 |
| JP | 2005-169465 | 6/2005 |
| JP | 2013-528109 | 7/2013 |

* cited by examiner

FIG. 1
(A)
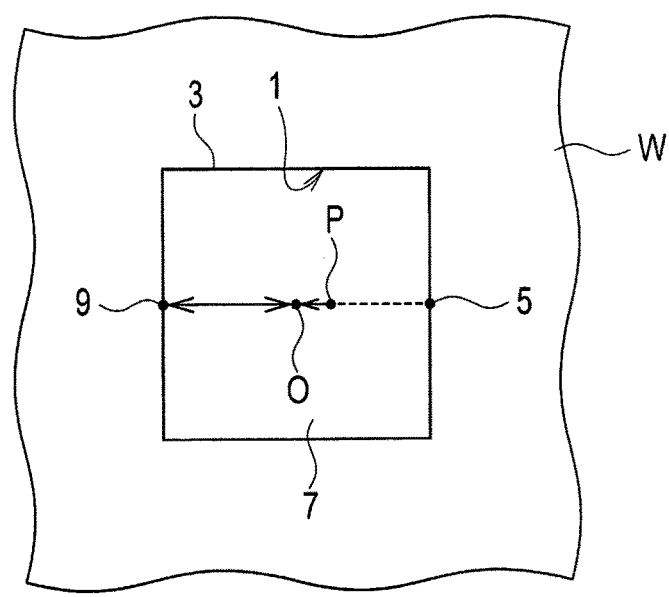
(B)
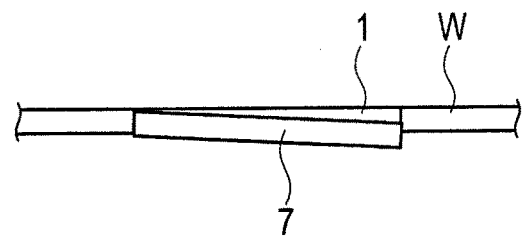
(C)
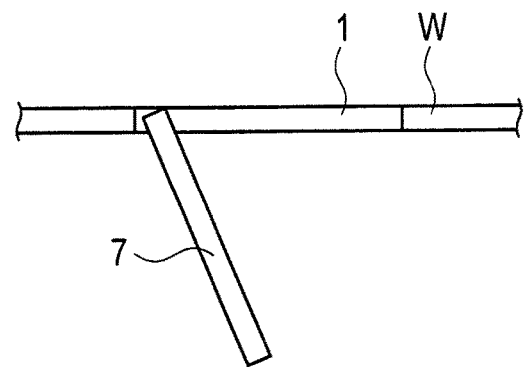

LASER PROCESSING METHOD AND LASER PROCESSING MACHINE

CROSS REFERENCE PARAGRAPH

This is a divisional application of pending U.S. patent application Ser. No. 15/035,928 filed on May 11, 2016, which is a U.S. National Stage Application of International Application PCT/JP2014/079559, filed Nov. 7, 2014, which claims priority to JAPAN Application No. 2013-245635, filed Nov. 28, 2013, and JAPAN Application No. 2013-247033, filed Nov. 29, 2013. The disclosures of these documents, including the specifications, drawings and claims, are incorporated herein by reference in their entirety.

TECHNICAL FIELD

The present invention relates to a laser processing method and a laser processing machine for carrying out hole-forming on a plate-shaped workpiece.

BACKGROUND ART

In hole-forming for forming a hole that may have various shapes such as circle or rectangle on a plate-shaped workpiece by laser-cutting the workpiece along an outline of the hole, a cutout piece may get stuck in the hole due to a narrow kerf width. Since a kerf width by laser processing with $CO_2$ laser becomes narrower than that by laser processing with fiber laser, the above-mentioned stuck tends to occur.

If a cutout piece gets stuck on the workpiece, the cutout piece may enter between a work table and the workpiece when moving the workpiece relatively to the work table, and thereby a surface of the workpiece may be scratched. Therefore, a laser processing machine provided with a cut and separation device for forcibly dropping a cutout piece off from a hole after hole-forming on a workpiece is proposed (see a Patent Document 1 listed below).

PRIOR ART DOCUMENT

Patent Document

Patent Document 1: Japanese Patent Application Publication No. H4-367391

SUMMARY OF INVENTION

The laser processing machine disclosed in the Patent Document 1 includes a laser processing head so as to be capable of moving it vertically, and includes a cut and separate device independently from the laser processing head. Then, it is configured so that the laser processing head is lifted up after hole-forming on a workpiece, and the cut and separation device is aligned below the lifted laser processing head and forcibly drops a cutout piece off. Therefore, there are problems, namely, its whole configuration is complicated, and it is inefficient, for example, in a case of sequential hole-forming at plural positions.

Therefore, an object of the present invention is to provide a laser processing method and a laser processing machine for preventing a cutout piece made in hole-forming by laser processing from getting stuck in a hole.

A first aspect of the present invention provides a laser processing method for carrying out hole-forming on a plate-shaped workpiece, the method comprising: [A] forming a hole by laser-cutting the workpiece along an outline of the hole to be formed; [B] moving a laser processing head with respect to the workpiece after forming the hole; and [C] dropping a cutout piece inside the outline of the hole by moving the laser processing head while jetting assist gas from the laser processing head to the cutout piece inside the outline.

According to the first aspect, since the assist gas is jetted from the laser processing head to drop the cutout piece off after forming the hole on the plate-shaped workpiece, the cutout piece is pushed downward by the assist gas and thereby surely dropped off from the inside of the processed hole.

A second aspect of the present invention provides a laser processing machine for carrying out hole-forming on a plate-shaped workpiece, the machine comprising: a first program storage that stores a plurality of hole-forming programs for forming a hole by laser-cutting the workpiece along an outline of the hole to be formed; a second program storage that stores a plurality of cutout piece drop programs for dropping a cutout piece inside the hole formed according to each of the hole-forming programs; a program selector that selects, from the second program storage, a cutout piece drop program associated with a hole-forming program selected from the first program storage to form the hole on the workpiece; and a working head controller that controls operations of a laser processing head according to the hole-forming program and the cutout piece drop program that are selected, wherein a motion path of the laser processing head after forming the hole on the workpiece and a jetting condition of assist gas to an inside of the outline from the laser processing head on the motion path are programed in each of the plurality of cutout piece drop programs.

According to the second aspect, since the assist gas is jetted from the laser processing head to drop the cutout piece off according to the cutout piece drop program after forming the hole on the plate-shaped workpiece according to the hole-forming program, the cutout piece is pushed downward by the assist gas and thereby surely dropped off from the inside of the processed hole.

A third aspect of the present invention provides a laser processing machine for carrying out hole-forming on a plate-shaped workpiece, the machine comprising: a program storage that stores a plurality of hole-forming programs for forming a hole by laser-cutting the workpiece along an outline of the hole to be formed; a program generator that generates, by referring to each of the hole-forming programs, a cutout piece drop program for dropping a cutout piece inside the hole formed according to each of the hole-forming programs; and a working head controller that controls operations of a laser processing head according to the hole-forming programs and the cutout piece drop program, wherein a motion path of the laser processing head with respect to the workpiece, a speed condition of the laser processing head on the motion path with respect to the workpiece and a jetting condition of assist gas are included in the cutout piece drop program.

According to the third aspect, since the assist gas is jetted from the laser processing head to drop the cutout piece off according to the generated cutout piece drop program after forming the hole on the plate-shaped workpiece according to the hole-forming program, the cutout piece is pushed downward by the assist gas and thereby surely dropped off from the inside of the processed hole. In addition, since the cutout piece drop program is generated by referring to the hole-forming program, formation of the hole and drop-off of the cutout piece can be done efficiently.

BRIEF DESCRIPTION OF DRAWINGS

FIG. 1 (A) is a plan view, (B) is a cross-sectional view (an example of an stuck cutout piece) and (C) is a cross-sectional view (another example of an stuck cutout piece) for explaining hole-forming on a workpiece by a laser processing method according to an embodiment.

DESCRIPTION OF EMBODIMENTS

Figure 2:
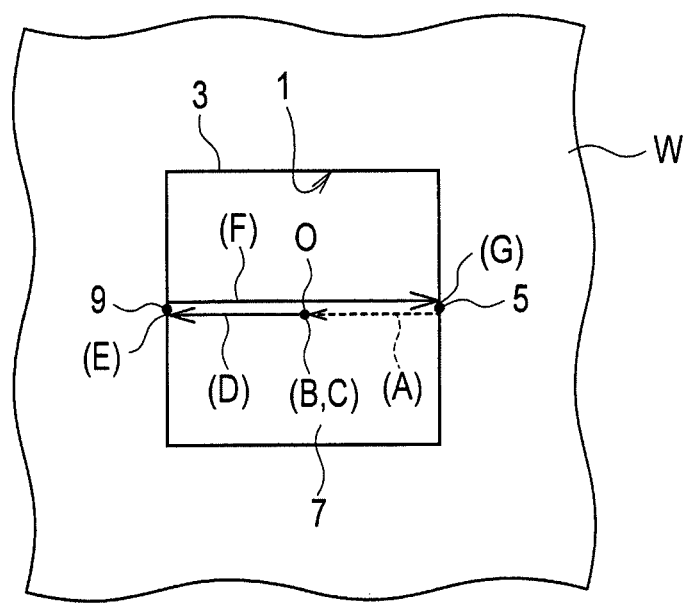
FIG. 2 It is a plan view of a hole-forming portion for explaining operations of a laser processing head for drop the cutout piece off.

When forming a hole 1 (see FIG. 1 (A)) on a plate-shaped workpiece W by a laser processing machine 10 (see FIG. 3), the hole 1 having a various shape such as circle or rectangle is formed by laser-cutting the workpiece W along an outline 3 (see FIG. 1(A)) of the hole 1. However, a cutout piece 7 (see FIG. 1(B) and FIG. 1(C)) may get stuck in the formed hole 1. In a case of a circular hole, a cutout piece 7 tends to get stuck when its diameter is not larger than 30 mm (5 to 30 mm). In addition, in a case of an elongated hole (an oval hole•ellipsoidal shape), a cutout piece 7 tends to get stuck when its minor axis is not larger than 30 mm (5 to 30 mm). In a case of a rectangular hole, a cutout piece 7 tends to get stuck when its one side is not larger than 30 mm (5 to 30 mm). Note that, since the laser processing machine 10 described hereinafter includes commonly known configurations except an after-described controller 11, detailed descriptions for the configurations of the laser processing machine 10 are omitted. The controller 11 will be described later in detail.

As shown in FIG. 1, in a case of laser processing a rectangular (square) hole 1 whose one side is not larger than 30 mm on a plate-shaped workpiece W, laser processing is started at an inside of an outline 3 of the hole 1. Piercing is done at a position near a center position O or a centroid position of the hole 1 (hereinafter, descriptions will be made with the center position O taken as an example) (step S30 in FIG. 5), and then laser-cutting is done from the piercing position P to the outline 3 (step S40). After the cutting line reaches the outline 3 (an intersect position 5 of the cutting line and the outline 3), the hole 1 is cut along the outline 3 (step S50).

When cutting along the outline 3 goes around and then returns to the intersect position 5, cutting of the hole 1 is finished (step S60), and emitting of a laser light and jetting of assist gas are stopped. It doesn't matter to think that the intersect position 5 and the working-end position are identical to each other (although they are distanced by radius of a cross-sectional circle of the laser light). Therefore, it is regarded that the intersect position 5 and the working-end position are synonymous.

In a case of forming the hole 1 by laser processing as described above, since the assist gas is jetted from a laser processing head 31 (see FIG. 3), a portion near the working-end position (intersect position) 5 of the cutout piece 7 moves downward by the assist gas jet to the working-end position 5 at the moment when the cutout piece 7 that is an inside portion of the outline 3 is separated from the workpiece W.

As the result, the cutout piece 7 may incline and get stuck as shown in FIG. 1(B). Alternatively, the portion of the cutout piece 7 near the working-end position 5 sufficiently moves downward, but a portion on an opposite side to the working-end position 5 may get stuck as shown in FIG. 1(C). Note that the cutout piece 7 that drops off from the hole 1 drops into a scrap box (not shown in the drawings).

If the cutout piece 7 gets stuck in the hole 1, the cutout piece 7 may enter between a work table and the workpiece W when moving the workpiece W, and thereby a surface of the workpiece W may be scratched. In addition, if the cutout piece 7 gets stuck, the laser processing head 31 may contact with the cutout piece 7 when moving the laser processing head 31.

Therefore, an operation for dropping the cutout piece 7 off from the inside of the hole 1 is done in the present embodiment.

As described above, the laser processing is finished by stopping emitting of a laser light and jetting of assist gas when cutting for the hole 1 along the outline 3 reaches the working-end position 5. Then, the laser processing head 31 is moved toward an opposite side to the working-end position 5 from the working-end position 5 to a position near the center position O of the hole 1 without changing a height level of the laser processing head 31 (step S70). Note that the laser processing head 31 may be moved with respect to the workpiece W that remains stationary, or the workpiece W may be moved with respect to the laser processing head 31 that remains stationary. Otherwise, the laser processing head 31 is moved with respect to the workpiece W by moving both of them concurrently. When the laser processing head 31 is moved toward the opposite side to the working-end position 5, the assist gas is jet, with a pressure equal-to or higher-than a pressure during the laser processing, from the laser processing head 31 at a position near the center position O (step S80).

When the laser processing head 31 reaches the position near the center position O, the laser processing head is temporarily stopped and the assist gas is jet (step S80). Then, the laser processing head 31 is moved to the opposite side to the working-end position 5 while keeping on jetting the assist gas (step S90), and then temporarily stopped when it reaches the outline 3 on the opposite side or a position near it (hereinafter, it is called as an opposite-side position 9) (step S100). Subsequently, the laser processing head 31 is returned to the working-end position 5 while keeping on jetting the assist gas (step S31).

Namely, while the laser processing head 31 is moved from the position near the center position O to the opposite-side position 9 and from the opposite-side position 9 to the working-end position 5, the assist gas is jetted from the laser processing head 31. Then, when the laser processing head 31 is returned to the working-end position 5, jetting of the assist gas is stopped.

Figure 7:
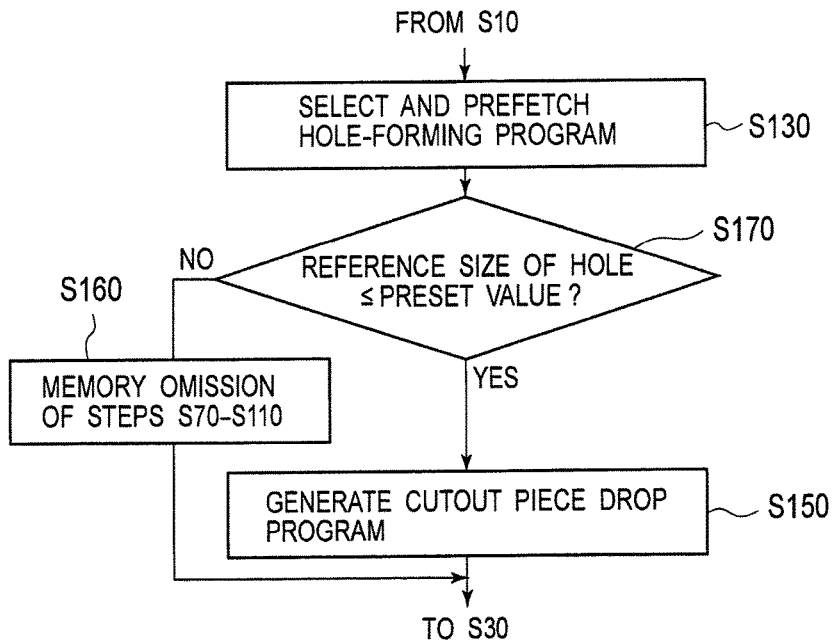
FIG. 7 It is a flowchart of the laser processing machine (method) according to a modified example of the second embodiment.

As described above, while the laser processing head 31 is moved from the working-end position 5 to the opposite-side position 9, the laser processing head 31 is temporarily stopped at the position near the center position O. The assist gas is jet for a preset time at this stop position. Therefore, in the case where the cutout piece 7 gets stuck as shown in FIG. 7(B), the assist gas is jet to the position near the center position O of the cutout piece 7, and thereby a pressure is applied first to the position near the center position O.

Therefore, the portion of the cutout piece 7 near the center position O is pushed downward, and thereby the cutout piece 7 drops off while it nearly keeps its horizontality. In addition, also while the laser processing head 31 is moved from the position near the center position O to the opposite-side position 9, jetting of the assist gas is continued. Therefore, a position to which the pressure is applied changes, and thereby the cutout piece 7 can be surely dropped off while preventing the cutout piece 7 from swinging under its stuck state. Note that the assist gas may be jet continuously or continually (pulsatingly).

In addition, the assist gas is also jet while the laser processing head 31 is moved from the position near the center position O to the opposite-side position 9, and then the laser processing head 31 is temporarily stopped at the opposite-side position 9. The assist gas is jet intensively for the preset time in this stop state. Therefore, also in the case where the cutout piece 7 that already inclines preliminarily gets stuck at a position near the opposite-side position 9 as shown in FIG. 1(C), the cutout piece 7 can be surely dropped off, because the assist gas is jet intensively to a portion of the cutout piece 7 near the opposite-side position 9.

To describe repeatedly, the laser processing head 31 is moved from the working-end position 5 to the position near the center position O after laser-processing of the hole 1, and then the assist gas is continuously jetted from the laser processing head 31 while moving the laser processing head 31 from the position near the center position O to the opposite-side position 9. According to this, the cutout piece 7 can be surely prevented from getting stuck. In addition, in the present embodiment, the assist gas is continuously jet also while moving the laser processing head 31 from the opposite-side position 9 to the working-end position 5. According to this, the cutout piece 7 can be more surely prevented from getting stuck.

Note that the assist gas may be jet also while the laser processing head 31 is moved from the working-end position 5 to the position near the center position O of the hole 1 after laser-processing of the hole 1. In this case, the assist gas is jet to the portion of the cutout piece 7 near the working-end position 5 as shown in FIG. 1(B). Therefore, there may be a case where the portion of the cutout piece 7 near the working-end position 5 is pushed downward and then it is changed into the state shown in FIG. 1(C).

Namely, differently from the case where it is in the state shown in FIG. 1(C) just after laser-processing of the hole 1, it is changed into the state shown in FIG. 1(C) by jetting of the assist gas. In this case, a retaining force of the stuck cutout piece 7 may be increased by the applied pressure. Therefore, since it becomes hard to relieve the stuck cutout piece 7, it is less desirable to jet the assist gas while moving the laser processing head 31 from the working-end position 5 to the position near the center position O of the hole 1.

As described above, in a case of forming the small hole 1 (its diameter, minor axis or one side is not larger than 30 mm) on the workpiece W by laser processing, the above operation for dropping the cutout piece 7 off (moving the laser processing head 31 and jetting the assist gas) is carried out regardless of whether or not the cutout piece 7 gets stuck. In the present embodiment, the above operation for dropping the cutout piece 7 off is carried out automatically after forming the small hole 1 by laser processing.

Next, configurations for automatically carrying out the operation for dropping the cutout piece 7 off after forming the small hole 1 on the workpiece W by laser processing will be described. Note that, configurations in the laser processing machine 10 for moving the laser processing head 31 in a left-right direction (an X-axis direction), a front-rear direction (a Y-axis direction) and an up-down direction (a Z-axis direction) are commonly-known configurations, so that the controller 11 for controlling operations of the laser processing head 31 will be described in detail hereinafter. First, the controller 11 according to a first embodiment will be described.

A control of the laser processing head 31 for the above operation, e.g. for dropping the cutout piece 7 off includes an operation for moving it from the working-end position 5 to the position near the center position O (an operation A), an operation for temporarily stopping it at the position near the center position O (an operation B), an operation for jetting the assist gas at the position near the center position O (an operation C), an operation for moving it from the position near the center position O to the opposite-side position 9 (an operation D), an operation for temporarily stopping it at the opposite-side position 9 (an operation E), an operation for moving it from the opposite-side position 9 to the working-end position 5 (an operation F), and an operation for jetting the assist gas at the working-end position 5 (an operation G). The above operations A to G are shown in FIG. 2.

Figure 3:
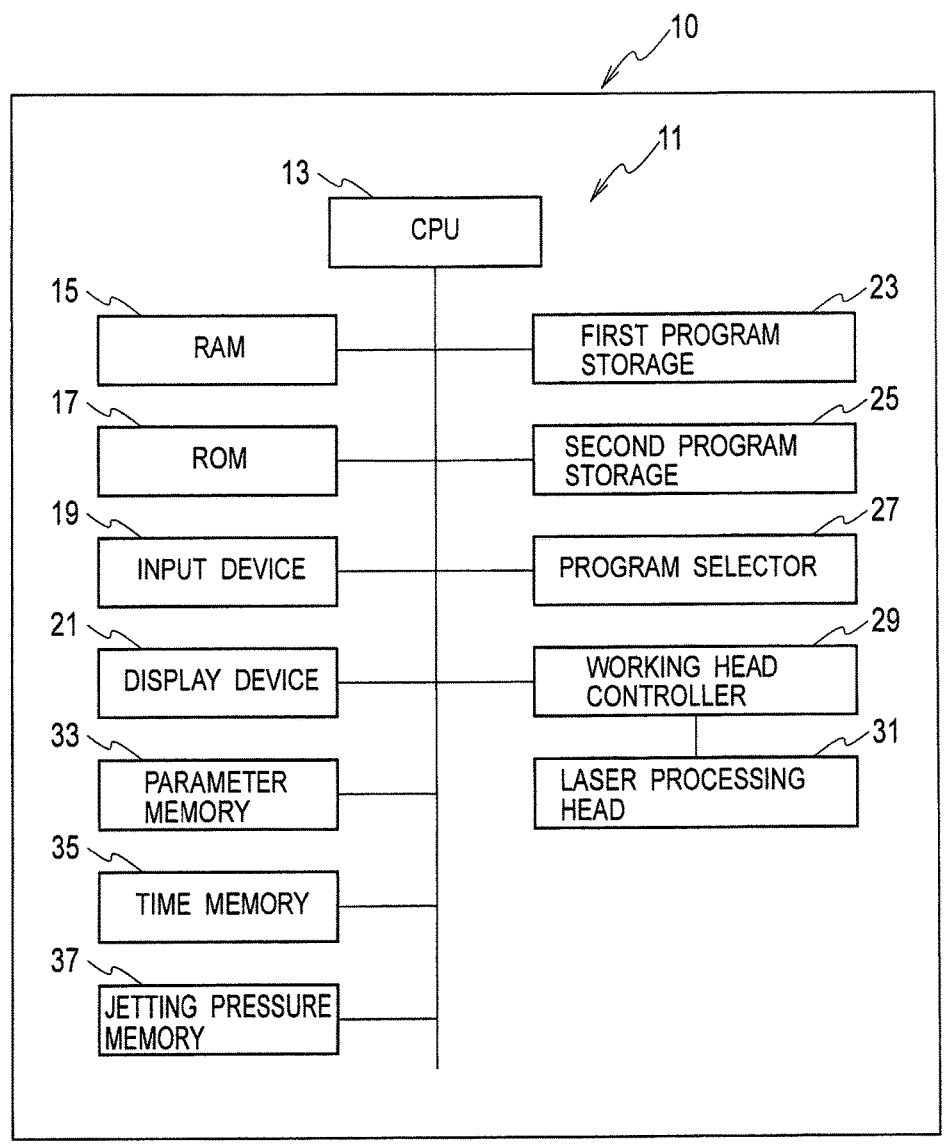
FIG. 3 It is a block diagram showing a schematic configuration of a controller of a laser processing machine according to a first embodiment.

A schematic block diagram of the controller 11 that controls the operations A to G (the operations of the laser processing head 31 of the laser processing machine 10) is shown in FIG. 3. Namely, the controller 11 is configured of a computer, and includes a CPU 13, a RAM 15, a ROM 17, an input device 19 and a display device 21. In addition, the controller 11 includes a first program storage 23.

The first program storage 23 stores hole-forming programs for forming (cutting) a hole that may have predefined various shapes such as a circular hole, an elongated hole and a rectangular hole by laser processing. The hole-forming programs are prepared for every shape of the hole 1 to be cut and/or for every specification (material, thickness and so on) of the workpiece W, and, for example, a hole-shape code(s) that indicates a hole shape and the hole-forming program(s) are stored while being associated with each other.

In addition, the controller 11 is provided with a second program storage 25. The second program storage 25 stores cutout piece drop programs that are associated with the program codes of the hole-forming programs and the hole shape codes that are stored in the first program storage 23. In the cutout piece drop program(s), the operations A to G that correspond to a hole shape are preliminarily programmed. Namely, in the cutout piece drop program(s), a motion path of the laser processing head 31 and a jetting condition of the assist gas for moving the laser processing head 31 and jetting the assist gas to the cutout piece 7 inside the outline 3 of the hole 1 are set. Specifically, in the cutout piece drop program associated with the square hole 1 as shown in FIG. 1, the operations A to G associated with a square as shown in FIG. 2 are programmed.

Note that there are various shapes as a shape of the hole 1, such as a rectangle, a circular hole and an elongated hole, and the above-described operations A to G are preliminarily programmed in the cutout piece drop program while being associated with the hole-forming program associated with each shape.

Figure 5:
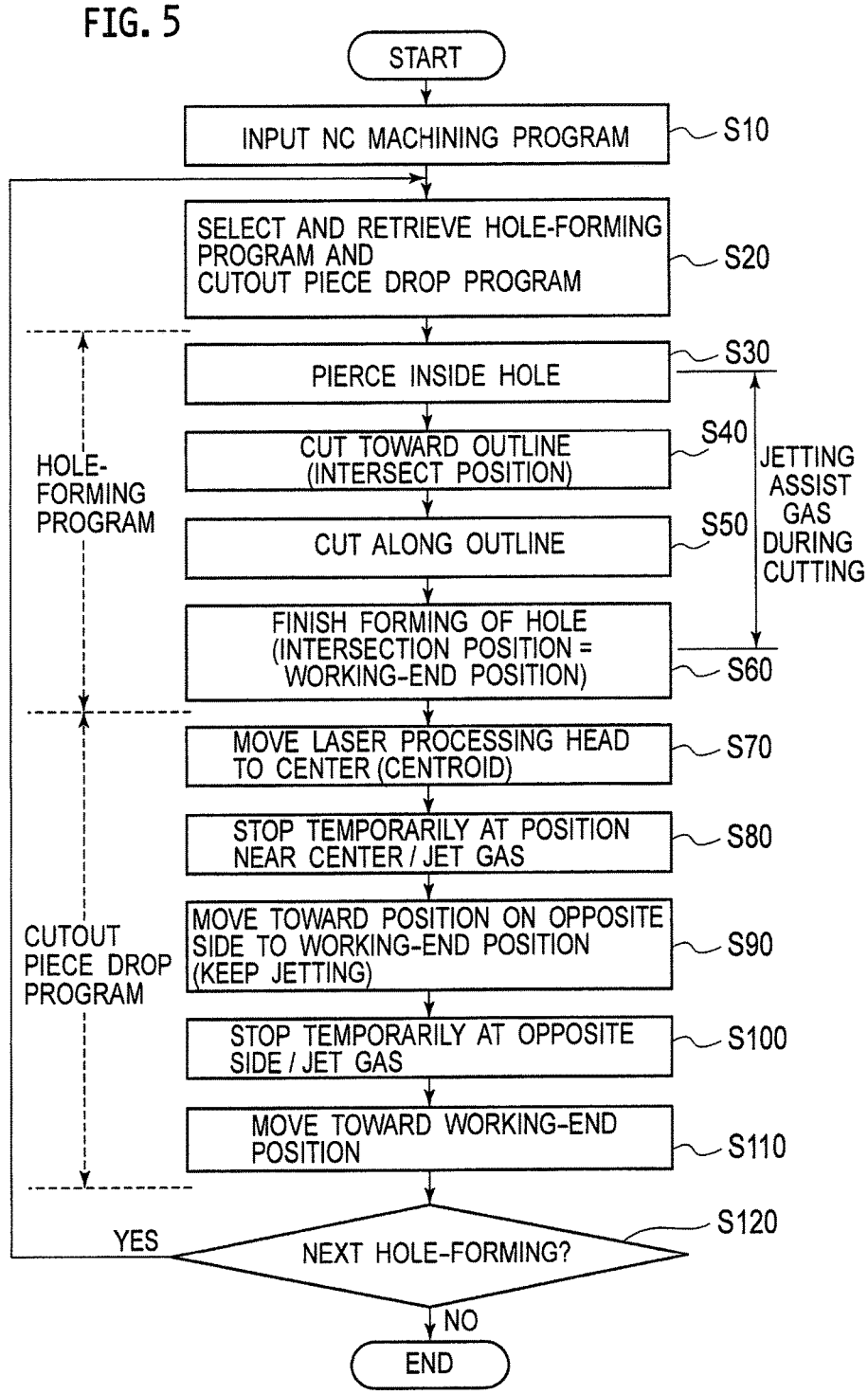
FIG. 5 It is a flowchart of the laser processing machine (method) according to the first embodiment.

Specifically, an NC machining program including a hole shape code generated by an automatic programming machine or the like is supplied from the input device 19 to the controller 11 via a storage medium or a transfer device (step S10 in FIG. 5). Or, an NC machining program is directly input to the controller 11 by a keyboard or the like that serves as the input device 19. When the NC machining program including the hole shape code is input to the controller 11, a hole-forming program associated with the hole code in the NC machining program is selected from the programs stored in the first program storage 23 by a program selector 27 of the controller 11 (step S20). In addition, in the step S20, the selected hole-forming program is fetched from the first program storage 23, and then the shape, the working-end position 5, the center position O (or the centroid position) and the opposite-side position 9 of the hole 1 to be cut (the cutout piece 7) are retrieved (or calculated) from the fetched hole-forming program. Then, the operations of the laser processing head 31 are controlled by a working head controller 29 according to the selected hole-forming program, and thereby the hole 1 is formed by laser processing (steps S30 to S60).

In addition, the cutout piece drop program associated with the program code and the hole shape code of the selected hole-forming program is selected from the programs stored in the second program storage 25 (step S20). Then, the above-described operations A to G of the laser processing head 31 is controlled by the working head controller 29 according to the selected cutout piece drop program after the formation of the hole 1, and thereby the cutout piece 7 is dropped off (steps S70 to S100).

According to the present embodiment, the hole-forming program for forming the hole 1 by laser processing and the cutout piece drop program associated with the selected hole-forming program are selected when the NC machining program including the hole shape code associated with the desired-shaped hole 1 is input to the controller 11, and then the operations A to G for forming the hole 1 by laser processing and dropping the cutout piece 7 off are automatically carried out. Then, these processes are sequentially repeated for plural holes, so that formation of the holes 1 on the workpiece W and drop-off of the cutout pieces 7 can be done. Therefore, its handling is easy and laser processing for forming the plural holes 1 can be done efficiently.

Note that the cutout piece drop program in which the operations A to G are preliminarily programmed with being associated with the hole-forming program is stored in the second program storage 25 in the present embodiment. However, a following configuration may be adopted.

With respect to a moving speed of a moving operation(s) in the above-described operations A, D and F, an appropriate speed parameter is selected from speed parameters preliminarily stored in a speed parameter memory 33, and then an appropriate speed is set. In addition, with respect to a stop time of a temporary stop in the operations B and E, an appropriate time parameter is selected from time parameters preliminarily stored in a time parameter memory 35, and then an appropriate stop time is set. Further, with respect to a jetting pressure of the assist gas for the jetting operation in the operation C, an appropriate jetting pressure parameter is selected from jetting pressure parameters preliminarily stored in a jetting pressure parameter memory 37, and then an appropriate jetting pressure is set.

These settings of the parameters are done by inputting the selected parameters, by use of the input device 19, into portions displayed on the display device 21 that are associated with the above parameters of the operations A to G of the cutout piece drop program selected from the second program storage 25.

According to this configuration, a speed condition of the laser processing head 31, a jetting pressure condition of the assist gas, and a jetting time condition of the assist gas can be set more appropriately. Therefore, the cutout piece 7 can be dropped off more surely according to accuracy of a cut surface or the like, for example. In other words, even in a case where a shape of the hole 1 is identical, the above-described operations A to G can be set independently according to accuracy of a cut surface, or difference of a stuck state caused by thickness of the workpiece W.

Note that it is possible to preliminarily set these parameters in the parameter memories 33, 35 and 37 while associating them with thickness and material, and to select appropriate parameters that are associated with thickness information and material information in the NC machining program supplied from the input device 19.

Figure 4:
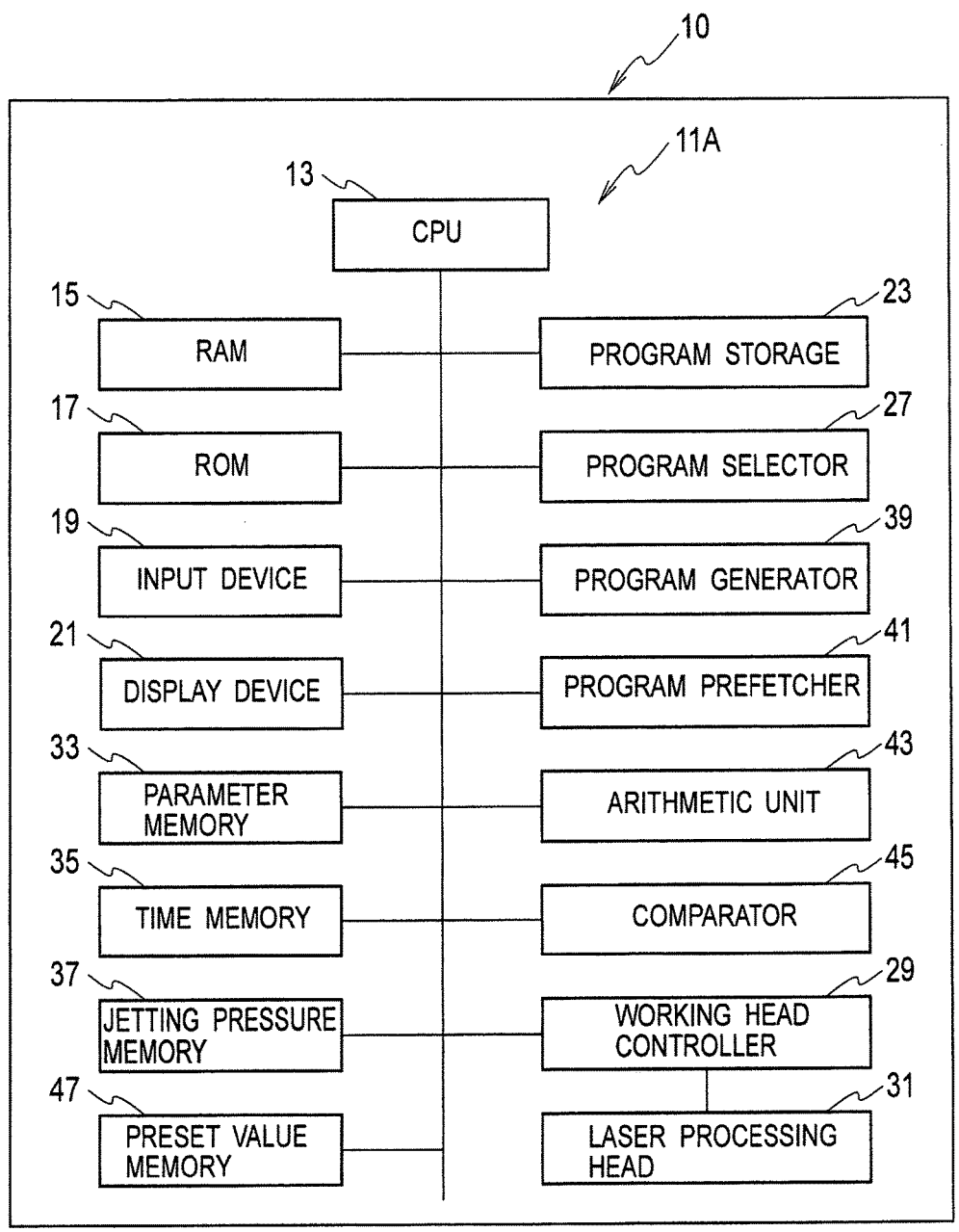
FIG. 4 It is a block diagram showing a schematic configuration of a controller of a laser processing machine according to a second embodiment.

Next, a controller 11A according to a second embodiment will be described. As shown in FIG. 4, configurations that realize functions identical or equivalent to functions realized by the configurations of the controller according to the first embodiment are labelled with identical signs, and their redundant descriptions will be omitted. The controller 11A of the present embodiment is significantly different from the controller 11 of the first embodiment in that the second program storage 25 is omitted and a program generator 39 is provided instead of it.

The program generator 39 generates, by referring to the hole-forming program selected by the program selector 27, the cutout piece drop program for dropping the cutout piece 7 off from the hole 1 formed according to the hole-forming program.

Figure 6:
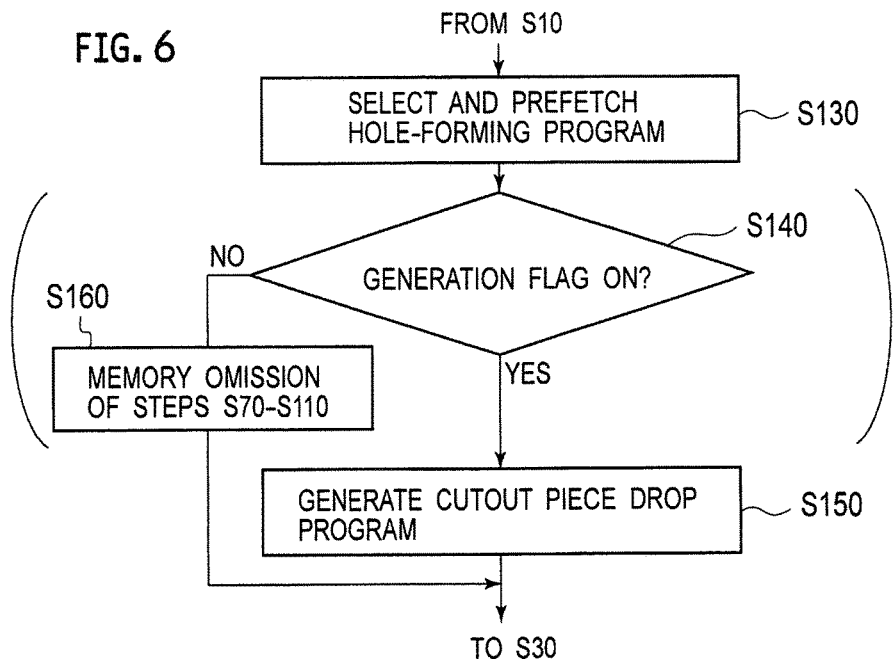
FIG. 6 It is a flowchart of the laser processing machine (method) according to the second embodiment.

Specifically, when the NC machining program including the hole shape code generated by an automatic programming machine or the like is supplied from the input device 19 to the controller 11A (step S10), the hole-forming program associated with the hole code in the NC machining program is selected from the programs stored in the first program storage 23 (step S130 in FIG. 6). Then, the operations of the laser processing head 31 are controlled by the working head controller 29 according to the selected hole-forming program, and thereby the hole 1 is formed by laser processing (steps S30 to S60). Here, when the hole-forming program is selected, the hole-forming program is prefetched by a program prefetcher 41 (step S130).

A reference size of the hole 1 to be formed (a length of one side for a rectangular hole, a diameter for a circular hole, a length of a minor axis for an elongated hole) is retrieved by referring to various data in the hole-forming program prefetched by the program prefetcher 41. In addition, the opposite-side position 9 is calculated by an arithmetic unit 43 by referring to the working-end position 5 and the center position O in the hole-forming program.

Therefore, in the program generator 39, the above-described operations A to G are set by retrieving and calculating the working-end position 5, the center position O and the opposite-side position 9 based on the hole-forming program prefetched by the program prefetcher 41. At this time, the appropriate parameters are selected from the speed parameter memory 33, the time parameter memory 35 and the jetting pressure parameter memory 37, and thereby the cutout piece drop program associated with the hole-forming program is generated (step S150). Then, the operations for dropping-off the cutout piece 7 are carried out according to the generated cutout piece drop program (steps S70 to S110).

Note that the cutout piece drop program may be generated every time when the hole-forming program is selected, or it is possible to prefetch all the hole-forming programs included in the NC machining program and then preliminarily generate and store the cutout piece drop programs associated with all the hole-forming programs. In this case, the cutout piece drop program associated with the hole-forming program of the hole 1 to be formed is selected to drop the cutout piece 7 off when the hole 1 is to be formed by laser processing according to the NC machining program.

Namely, in the present embodiment, the above-described operations A to G are carried out according to the cutout piece drop program generated by referring to various data of the selected hole-forming program. Therefore, it is not needed to preliminarily prepare the cutout piece drop program associated with the hole-forming program. As the result, it is possible to easily execute the cutout piece drop program additionally after forming the hole 1 by the hole-forming program that is primarily prepared. In a case of generating the cutout piece drop program as in the present embodiment, it is possible to preliminarily include a flag indicating whether or not to generate the cutout piece drop program in the hole-forming program, and then generate the cutout piece drop program only when the flag is set to ON (generation is needed) (step S140 in FIG. 6). Note that, when the flag is set to OFF, the cutout piece drop program is not generated, and thereby the operations for dropping-off the cutout piece 7 are not carried out (step S160).

Note that, for example, the cutout piece 7 tends to get stuck in a case of forming a small rectangular hole having one side not larger than 30 mm. Even in a case where the hole 1 is a circular hole, the cutout piece 7 may get stuck while it slightly inclines with respect to horizontal plane as shown in FIG. 1 (B), and it tends to get stuck in this case when its diameter is not larger than 30 mm. Therefore, the above-described operations A to G by the cutout piece drop program may be carried out for a case where the small hole 1 that tends to get the cutout piece 7 stuck is formed.

Therefore, in a case of generating the cutout piece drop program by the program generator 39, it is preferable, e.g. in a case of a rectangular hole, to determine whether its one side is not larger than a preset value (e.g. 30 mm) or is larger than the preset value (in a case of a circular hole or an elongated hole, to determine whether its diameter or its minor axis is not larger than a preset value or is larger than the preset value) (step S170 in FIG. 7), and then generate the cutout piece drop program (step S150) only when it is not larger than the preset value (YES in step S170). In this case, it can be easily achieved by adding a comparator 45 to the above-described configuration of the second embodiment.

Here, a shape and a dimension of the hole 1 to be formed are selected by the program selector 27, and can be judged from various data in the hole-forming program prefetched by the program prefetcher 41. Therefore, the shape and the dimension of the hole 1 are calculated by the arithmetic unit 43 by referring to the selected hole-forming program, and then, in a case of a rectangular hole, the length of the short side and the preset value preliminarily stored in a preset value memory 47 are compared with each other by the comparator 45 (it is determined whether or not the rectangular hole is the hole 1 that tends to get the cutout piece 7 stuck). In a case of a circular hole or an elongated hole, its diameter or its minor axis is compared with the preset value.

Then, only when the short side (the diameter or the minor axis) is not larger than the preset value, a command signal for generating the cutout piece drop program associated with the selected hole-forming program is output from the comparator 45 to the program generator 39. In this manner, the program generator 39 generates the cutout piece drop program associated with the selected hole-forming program when the command signal is input thereto.

In the present embodiment, the cutout piece drop program is not generated for all the selected hole-forming programs, but the cutout piece drop program is generated only for the hole-forming program(s) that forms the small hole 1 that tends to get the cutout piece 7 stuck. Therefore, burdens to the controller 11A can be reduced, and thereby workings can be done efficiently in a case of forming the plural holes 1 on the workpiece W.

The present invention is not limited to the above embodiments, but can be modified appropriately within a scope of the invention. For example, the first program storage 23 (see FIG. 3) in the first embodiment and the program storage 23 (see FIG. 4) in the second embodiment store the hole-forming program(s). However, if the hole-forming program is included in the NC machining program preliminarily generated by an automatic programming machine, the hole-forming program may be directly selected from the NC machining program. Or, the plural hole-forming programs may be extracted from the NC machining program, and then stored in the first program storage 23 or the program storage 23.

In addition, the controller 11 in the first embodiment includes the first program storage 23, the second program storage 25 and the program selector 27. However, these components may be provided in an automatic programming machine that generates the NC machining program. In this case, the hole-forming program and the cutout piece drop program are preliminarily included in the NC machining program generated by the automatic programming machine. The NC machining program is supplied to the controller 11 and then executed, so that the hole 1 is formed and the cutout piece 7 is dropped off.

The controller 11A in the second embodiment includes the program storage 23, the program selector 27, the program generator 39, the program prefetcher 41, the arithmetic unit 43 and the comparator 45. Similarly, these components may be provided in an automatic programming machine that generates the NC machining program.

In addition, the jetting pressure of the assist gas jetted from the laser processing head may be increased. Further, plural cutout piece drop nozzles that jet high-pressure air (the assist gas) may be provided around the nozzle of the laser processing head to drop the cutout piece 7 off by the high-pressure air jetted from the cutout piece drop nozzles. In any case, the cutout piece is dropped off by effectively using the jetting function of the assist gas jetted from the laser processing head in laser processing.

According to the above embodiments, even in a case for forming the holes 1 sequentially, it is possible to jet the assist gas from the laser processing head just after the formation of the hole 1, and thereby it is possible to sequentially form the plural holes 1 efficiently.

What is claimed is:

1. A laser processing machine for carrying out hole-forming on a plate-shaped workpiece, the machine comprising:
  a laser processing machine controller including:
    a first memory that stores a plurality of hole-forming programs for forming a hole by laser-cutting the workpiece along an outline of the hole to be formed;

a second memory that stores a plurality of cutout piece drop programs for dropping a cutout piece inside the hole formed according to each of the hole-forming programs;

a cutout piece drop program associated with a hole-forming program selected from the first memory, being selected from the second memory to form the hole on the workpiece; and a working head controller that controls operations of a laser processing head according to the hole-forming program and the cutout piece drop program that are selected, wherein a motion path of the laser processing head after forming the hole on the workpiece and a jetting condition of assist gas to an inside of the outline from the laser processing head on the motion path are programmed in each of the plurality of cutout piece drop programs.

2. The laser processing machine according to claim 1, further comprising:

an input to which a speed condition of the laser processing head on the motion path with respect to the workpiece and a jetting condition of the assist gas are input for a specification of the workpiece with respect to each of the cutout piece drop programs, wherein the cutout piece drop program includes the speed condition and the jetting condition that are input to the input.

3. A laser processing machine for carrying out hole-forming on a plate-shaped workpiece, the machine comprising:

laser processing machine controller including:

a memory that stores a plurality of hole-forming programs for forming a hole by laser-cutting the workpiece along an outline of the hole to be formed;

wherein a cutout piece drop program for dropping a cutout piece inside the hole formed according to each of the hole-forming programs is generated by referring to each of the hole-forming programs; and a working head controller that controls operations of a laser processing head according to the hole-forming programs and the cutout piece drop program, wherein a motion path of the laser processing head with respect to the workpiece, a speed condition of the laser processing head on the motion path with respect to the workpiece and a jetting condition of assist gas are included in the cutout piece drop program.

4. The laser processing machine according to claim 3, further comprising:

comparing a reference size of the hole to be formed and a preset value preliminarily set with each other, wherein, as a result of the comparison the cutout piece drop program is generated only when the reference size is not larger than the preset value.

* * * * *